Feb. 20, 1923.
T. W. BINDER.
KITCHEN APPLIANCE.
FILED DEC. 19, 1921.
1,445,867.
2 SHEETS—SHEET 1.
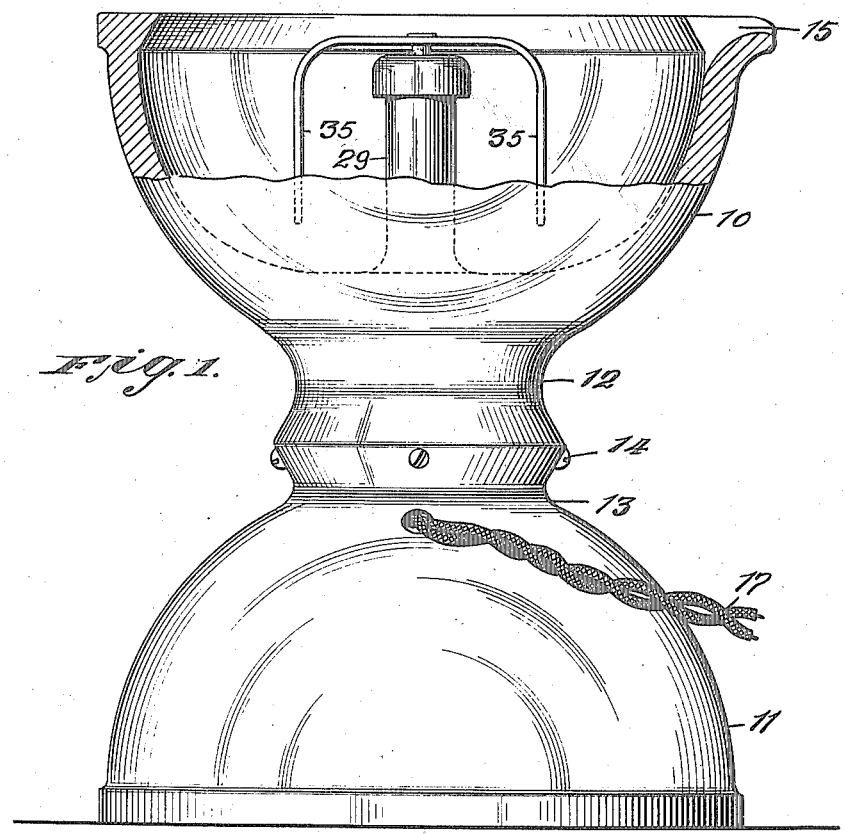
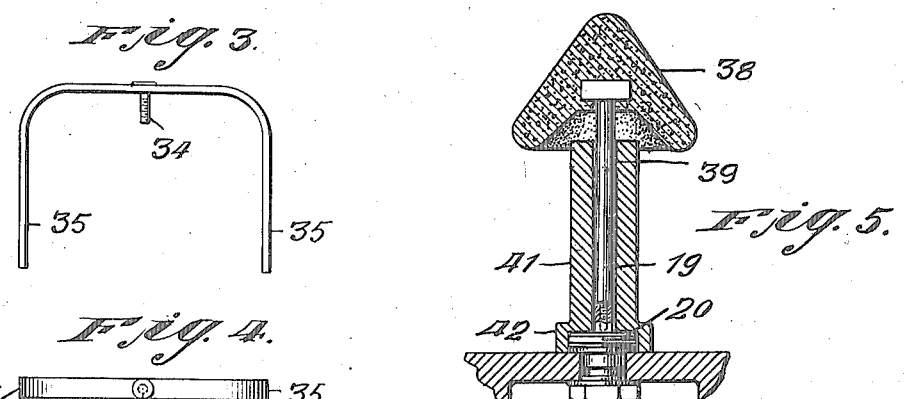
INVENTOR
Thomas W. Binder
BY
ATTORNEYS Feb. 20, 1923.
T. W. BINDER.
KITCHEN APPLIANCE.
FILED DEC. 19, 1921.
1,445,867.
2 SHEETS—SHEET 2.
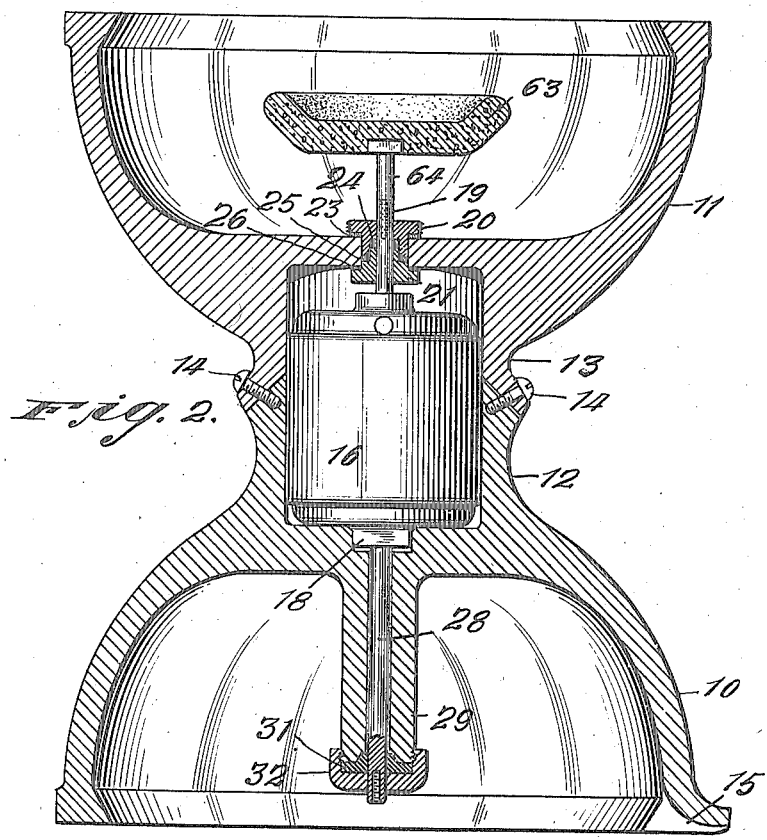
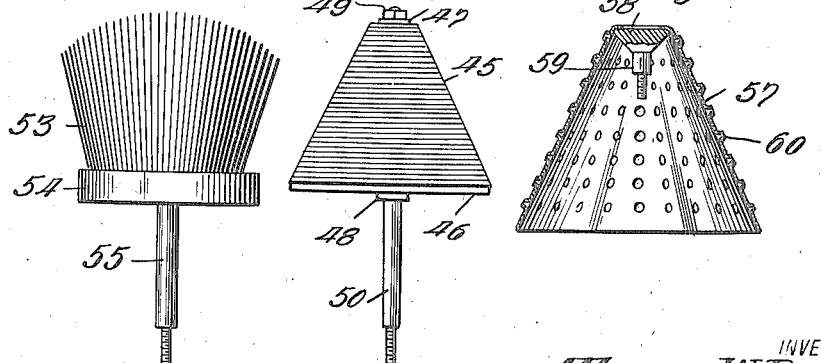
INVENTOR
Thomas W. Binder
BY
ATTORNEYS Patented Feb. 20, 1923.

1,445,867

UNITED STATES PATENT OFFICE.

THOMAS W. BINDER, OF TRENTON, NEW JERSEY.

KITCHEN APPLIANCE.

Application filed December 19, 1921. Serial No. 523,372.

*To all whom it may concern:*

Be it known that I, THOMAS W. BINDER, a citizen of the United States, residing in Trenton, county of Mercer, and State of New Jersey, have invented certain new and useful Improvements in Kitchen Appliances, of which the following is a specification.

The object of this invention is to provide a new kitchen appliance adapted for such purposes as stirring, mixing and grating, and also for such purposes as peeling vegetables and the scouring, grinding and buffing of kitchen utensils and implements.

In attaining these objects, I provide a device which may be said to be characterized by oppositely extending bowl portions, and a motor located between said bowl portions and having a shaft extending into the latter; the ends of the shaft being adapted to have tools attached thereto. Preferably, the said bowl portions also serve as base portions upon either of which the device may stand. By thus providing two bowl portions, it is possible to confine one to the stirring, mixing and grating of foods, and the other to operations which are more remotely connected with the preparation of foods and do not require that bowl to be kept absolutely clean. Obviously, however, both bowls may be arranged to serve for the stirring, mixing and grating of food materials, if this is considered desirable.

The invention will be understood from the following description of a preferred embodiment thereof, taken in connection with the accompanying drawings, in which Figure 1 is an elevation, partly in section, of the appliance, that bowl being uppermost which serves for stirring, mixing and grating; Figure 2 is a sectional elevation of the appliance, with the bowl uppermost in which the peeling, scouring, grinding and buffing tools are used; Figures 3 and 4 are elevation and plan views of this stirring and mixing tool; Figure 5 is a sectional elevation showing the grinding tool secured to the motor shaft; Figure 6 is a sectional elevation of a buffing tool; Figure 7 is an elevation of a scouring brush; Figure 8 is a sectional elevation of a grating tool.

Referring to the drawings, the body member of the appliance is shown as comprising oppositely extending combined bowl and base members 10 and 11 having central portions 12 and 13 adapted to be secured to one another by any suitable means such as screws 14, and within which co-operating cavities are provided. These body members may be made of any suitable material such as porcelain or metal, or may be made of two or more materials combined; and their edges are preferably turned inwardly as shown, except for a pouring lip 15 in the bowl portion 10. Within the cavity provided between the bowl and base portions, is an electric motor 16 of any suitable design, the frame or casing of which may be held from rotation in the cavity in any suitable manner, as by providing at one end of the motor casing a square lug 18 adapted to enter a square recess in the end of the cavity provided in the base portion 12. Current for the motor is supplied thru the conductors 17 which pass thru a hole in the base member 13. The shaft of the motor 16 extends in opposite directions into the bowl member 10 and into the bowl member 11, and is provided at each end with means adapted for the attachment of various tools, as hereinafter described. The end 19 of the motor shaft which projects into the bowl 11, passes through bushings 20 and 21 which make threaded engagement with one another and, when screwed together, put under compression packing material located as shown at 23, 24, 25 and 26 in Figure 2. By this construction, a liquid tight seal is provided between the bowl 11 and the motor cavity. The other end 28 of the motor shaft extends freely through a hole in a pillar 29 preferably made integral with the bowl 10 and extending from the bottom nearly to the plane of the mouth thereof. The bowl 10 is intended for stirring, mixing and grating edible ingredients, and by providing the pillar 29 as a housing for the motor shaft, all joints below liquid levels in the bowl 10 are avoided, thereby facilitating cleansing of that bowl. The outer end of the space between the motor shaft and the pillar 29 may be closed in any suitable manner as by means of packing material 31 which may be put under compression by means of a cup-shaped cap 32 having a hole through which the motor shaft extends and provided with an internal threaded edge adapted to co-operate with threads on the outside of the end of the pillar 29.

The ends 19 and 28 of the motor shaft are provided with threaded holes adapted to receive the threaded ends of tools hereinafter described. The direction of the threads in each of these holes is such that when the tools are in use they will tend to screw into engagement with the shaft. Since the motor is preferably arranged to rotate always in the same direction, the threads in one end of the motor shaft will be right handed while those in the other end will be left handed, an arrangement which has the added advantage of permitting the motor shaft to be held stationary by grasping a tool on one end of the shaft while a tool on the other end is being unscrewed.

Obviously, many different styles of tools may be used with my appliance, and those which will now be described are merely illustrative.

In Figures 3 and 4 is shown a mixing tool having a threaded stem 34 adapted to screw into the end 28 of the motor shaft and provided with a yoke having two or more stirring fingers 35. It will be obvious that when this tool is rapidly revolved within the bowl 11, any ingredients therein will be stirred or mixed.

Figure 5 shows a sharpening stone 38 of cone shaped form secured to a spindle 39 adapted to screw into the end 19 of the motor shaft. The stem 39 of this tool is preferably long enough to bring the sharpening stone 38 outside of the plane of the mouth of the bowl 11, and in order to support the spindle from wabbling a housing 41 is preferably provided. This housing 41 is provided at one end with an enlarged portion 42 within which is a threaded cavity adapted to engage threads on the outside of the bushing 20 and thus hold the housing 41 firmly in position. The length of the housing 41 is preferably slightly less than the depth of the bowl 11, thereby making it possible to leave this housing in position within the bowl when the latter is serving as a base for the appliance.

Figure 6 illustrates a buffing tool which may be of any suitable form. As shown, this buffing tool comprises a plurality of discs of cloth 45 of decreasing diameters superimposed and clamped between metal discs 46 and 47 located between a collar 48 and a nut 49 on the spindle 50 which at its lower end is provided with a threaded portion adapted to enter the threaded end 19 of the motor shaft. With this tool also, the housing 41 is preferably used for the purpose of supporting the tool from wabbling.

The tool shown in Figure 7 is a brush adapted for scouring cooking utensils. As shown, this brush comprises bristles 53 preferably of wire which are mounted in a head 54 secured to a spindle 55 provided with a threaded end adapted to enter the threaded end 19 of the motor shaft. The housing 49 is preferably used with this tool also.

In Figure 8 is illustrated a grating tool adapted for grating foods. As shown, this tool comprises a truncated hollow cone 57 of sheet metal, to the inside of the smaller end of which is secured a supporting member 58 from which projects a spindle 59 provided with a threaded end adapted to co-operate with the threaded end 28 of the motor shaft. The cone shaped member 57 is provided with a large number of holes formed by punching the metal from the inside of the cone outwardly so as to leave ragged edges 60 around the holes, thereby giving a rough surface. When this tool is used for grating, the grated material will fly from the outer surface of the tool and will collect within the bowl 10, from which it may be readily removed when a sufficient amount has been grated.

The tool shown in Figure 2 mounted within the bowl 11, is a vegetable peeler which may consist of a coarse abrading wheel 63 of the form shown, mounted on a spindle 64 having a threaded end adapted to enter the threaded end 19 of the motor shaft. The spindle 64 of this tool is preferably made short enough so that the abrading wheel 63 lies within the bowl 11, thereby insuring that the vegetable skins which are ground off when the vegetables are held in engagement with said wheel collect in the bowl 11.

While I have shown one form in which my invention may be embodied, it is to be understood that this is merely illustrative and that it may be modified in many respects without departing from the spirit of the invention.

What I claim is:

1. In a device of the character described, oppositely extending bowl portions, and a motor located between said bowl portions and having its shaft extending into the latter and adapted to have tools attached thereto.

2. In a device of the character described, a body member having oppositely extending combined bowl and base portions, and a motor located between said bowl and base portions and having its shaft extending into the latter and adapted to have tools attached thereto.

3. In a device of the character described, a body member having a central portion and oppositely extending portions each adapted to serve as a combined bowl and base portion, and a motor located within the central portion of said body member and having its shaft extending into both of said bowl and base portions and adapted to have tools attached thereto for operation within said bowl and base portions.

4. In a device of the character described, a body member having oppositely extending combined bowl and base portions provided with central portions adapted to be secured to one another and within which a cavity is provided, and a motor located in said cavity and having its shaft extending into each bowl and base portion and adapted to have tools attached thereto.

5. In a device of the character described, a body member having oppositely extending bowl portions, a pillar extending from the bottom of one of said bowl portions, and a motor located between said bowl portions and having its shaft extending into the bottom of one and thru the pillar into the other bowl portion, the ends of the shaft being adapted to have tools attached thereto.

6. In a device of the character described, a body member having oppositely extending portions each adapted to serve as a combined bowl and base portion, a motor located between said bowl and base portions and having its shaft extending into each of the latter and adapted to have tools attached thereto for operation within said bowl and base portions, and liquid-tight sealing means co-operating with said shaft and said bowl and base portions.

In testimony whereof I have affixed my signature to this specification.

THOMAS W. BINDER.